United States Patent [19]

Fukuyama et al.

[11] Patent Number: 4,987,113
[45] Date of Patent: Jan. 22, 1991

[54] PREPARATION OF COAL LIQUEFACTION CATALYST

[75] Inventors: Tatsuo Fukuyama, Kawasaki; Toshihiko Okada; Sanseki Moriguchi, both of Yokohama; Yoshio Kamiya, Kawasaki; Eisuke Ogata, Chiba, all of Japan

[73] Assignee: Nippon Kokan Kaubshiki Kaisha, Tokyo, Japan

[21] Appl. No.: 272,234

[22] Filed: Nov. 16, 1988

Related U.S. Application Data

[60] Division of Ser. No. 921,795, Oct. 17, 1986, Pat. No. 4,820,405, which is a continuation of Ser. No. 779,239, Sep. 23, 1985, abandoned.

[30] Foreign Application Priority Data

| Sep. 29, 1984 | [JP] | Japan | 59-204231 |
| Sep. 29, 1984 | [JP] | Japan | 59-204232 |
| Sep. 29, 1984 | [JP] | Japan | 59-204235 |
| Sep. 29, 1984 | [JP] | Japan | 59-204236 |
| Sep. 29, 1984 | [JP] | Japan | 59-204237 |
| Sep. 29, 1984 | [JP] | Japan | 59-204240 |

[51] Int. Cl.$^5$ ............... B01J 23/74; C01G 49/02
[52] U.S. Cl. ............... 502/338; 502/516; 423/150
[58] Field of Search ............... 502/338, 416; 423/150

[56] References Cited

U.S. PATENT DOCUMENTS

| 2,478,942 | 8/1949 | Queneau et al. | 423/150 |
| 3,409,427 | 11/1968 | Bonnivard | 423/150 |
| 3,644,114 | 2/1972 | Vosahlova et al. | 423/150 |
| 3,892,639 | 7/1975 | Leavenworth et al. | 423/149 |
| 3,925,533 | 12/1975 | Weir et al. | 423/150 |
| 4,176,041 | 11/1979 | Mori et al. | 208/10 |
| 4,339,329 | 7/1982 | Kageyama et al. | 208/10 |
| 4,354,919 | 10/1982 | Oi et al. | 208/10 |
| 4,374,016 | 2/1983 | Tarrer et al. | 208/10 |
| 4,399,109 | 8/1983 | Iler et al. | 423/141 |
| 4,410,498 | 10/1983 | Hatch et al. | 423/146 |
| 4,411,766 | 10/1983 | Garg et al. | 208/10 |
| 4,515,678 | 5/1985 | Wernicke et al. | 208/10 |
| 4,545,816 | 10/1985 | Rappas | 423/141 |
| 4,820,405 | 4/1989 | Fukuyama et al. | 288/423 |

FOREIGN PATENT DOCUMENTS

| 0020992 | 7/1929 | Australia | 208/10 |
| 0108888 | 10/1939 | Australia | 208/10 |
| 3090077 | 11/1977 | Australia | . |
| 3956078 | 9/1978 | Australia | . |

(List continued on next page.)

OTHER PUBLICATIONS

Fukuyama et al., "Coal Liquefaction Catalysed by Iron Ore-Catalytic Activities of Laterite Ore", Oct. 1985, Proceedings 1985 International conference on Coal Science, pp. 181–184, Pergamon.

Dictionary of Geological Terms, Dolphin Reference Book, 1962, p. 280.

Ullmanns Encyklopadie der Technischen Chemie, vol. 17, pp. 243–244.

T. Fukuyama et al., "Coal Liquefaction Catalyzed By Iron Ore Catalytic Activities of Lateritre Ore", Technical Research Center, Nippon Kokan, K. K. Kawasaki, Japan.

T. Okada et al., "Coal Liquefaction Catalyzed by Iron Ores", Technical Research Center, Nippon Kokan K. K.

*Primary Examiner*—Anthony McFarlane
*Attorney, Agent, or Firm*—Frishauf, Holtz, Goodman & Woodward

[57] ABSTRACT

When low-quality iron ore is used as a coal liquefaction catalyst, in order to improve its catalytic activity it is subjected to one or a combination of reduction, heat-treatment, or washing with or immersion in water for a long period of time so as to remove catalyst poisons before it is used as a catalyst. When high-quality iron ore is used, it is first reduced with carbon monoxide and then used as a catalyst.

6 Claims, 1 Drawing Sheet

FOREIGN PATENT DOCUMENTS

| | | |
|---|---|---|
| 6363680 | 10/1980 | Australia . |
| 6906881 | 4/1981 | Australia . |
| 7532881 | 8/1981 | Australia . |
| 7803481 | 11/1981 | Australia . |
| 8515682 | 6/1982 | Australia . |
| 8884382 | 9/1982 | Australia . |
| 1079683 | 1/1983 | Australia . |
| 1139383 | 2/1983 | Australia . |
| 1346183 | 4/1983 | Australia . |
| 1353083 | 4/1983 | Australia . |
| 2110483 | 11/1983 | Australia . |
| 2718584 | 4/1984 | Australia . |
| 55-116794 | 9/1980 | Japan ..... 208/10 |
| 57-65779 | 4/1982 | Japan ..... 208/10 |
| 57-100188 | 6/1982 | Japan ..... 208/10 |
| 58-37085 | 3/1983 | Japan ..... 208/10 |
| 59-210992 | 4/1983 | Japan ..... 208/10 |

PREPARATION OF COAL LIQUEFACTION CATALYST

This is a division of application Ser. No. 06/921,795, filed Oct. 17, 1986, now U.S. Pat. No. 4,820,405, which is a continuation of Ser. No. 06/779,239, filed Sept. 23, 1985 (abandoned).

BACKGROUND OF THE INVENTION

1. Field of the Invention

The present invention relates to a method of liquefying coal by hydrogenation or hydrogenolysis of coal under high temperature and high pressure conditions, and in the presence of a coal liquefaction catalyst, thereby hydrogenating coal that has been placed in a solvent for the specific purpose of liquefaction.

2. Description of the Prior Art

Coal liquefaction methods include the direct liquefaction method wherein hydrogen is added at a high temperature and a high pressure so as to perform hydrogenolysis. In this method, a large amount of hydrogen is consumed, and the hydrogenation reaction conditions are severe. In order to moderate the reaction conditions, various catalysts are conventionally used, e.g., oxides or halides of cobalt, molybdenum, tungsten, tin, iron or lead, and the reaction is allowed to take place in the presence of a catalyst selected from these catalysts. However, none of these catalysts satisfies all the properties desired in such an application, i.e., high liquefaction activity, low cost, and availability in large amounts.

For example, in the conventional H-Coal method, 1 to 10 parts by weight of a Co-Mo based pellet catalyst are charged in a boiling water reaction tower based on 100 parts by weight of coal; coal slurry is passed through the tower, and coal is allowed to react with hydrogen at a temperature of about 450° C. and a hydrogen pressure of 150 to 220 kg/cm². However, since this catalyst is expensive, the method is prohibitively expensive.

A known method using iron ore as a ferric catalyst has the advantage of availability in large amounts, since iron ore is inexpensive. However, this advantage aside, if untreated, such a catalyst has a low liquefaction activity. For this reason, sulfur or a compound of sulfur is added as a promotor to improve liquefaction activity. Unfortunately, when sulfur or its compound is used in a large amount, sulfur or the sulfur compound is evident in the liquefied oil, thereby degrading its quality.

SUMMARY OF THE INVENTION

It is an object of the present invention to provide a method of converting coal into a liquid at a high conversion rate by improving the coal liquefaction activity of a catalyst consisting of iron ore so that liquefaction can be performed at a lower temperature and a lower pressure than in a conventional method using iron ore, without requiring the use of a promotor and requiring only a small amount of catalyst.

In order to achieve the above object of the present invention, low-quality iron ore is subjected to one or a combination of a heat-treatment, reduction, and washing with or immersion in water for a long period of time so as to improve catalyst activity, and treated low-quality iron ore is used as a catalyst. (High-quality iron ore reduced by carbon monoxide can also be used as a catalyst.)

According to the present invention, low- or high-quality iron ore is treated and then used as a catalyst. Therefore, catalytic activity can be increased so that coal liquefaction can be performed at a lower pressure, a lower temperature and a higher conversion rate than that of a conventional method. Furthermore, since a large amount of a promotor need not be used, the quality of the resultant product will not be degraded.

DETAILED DESCRIPTION OF THE PREFERRED EMBODIMENT

Figure 1:
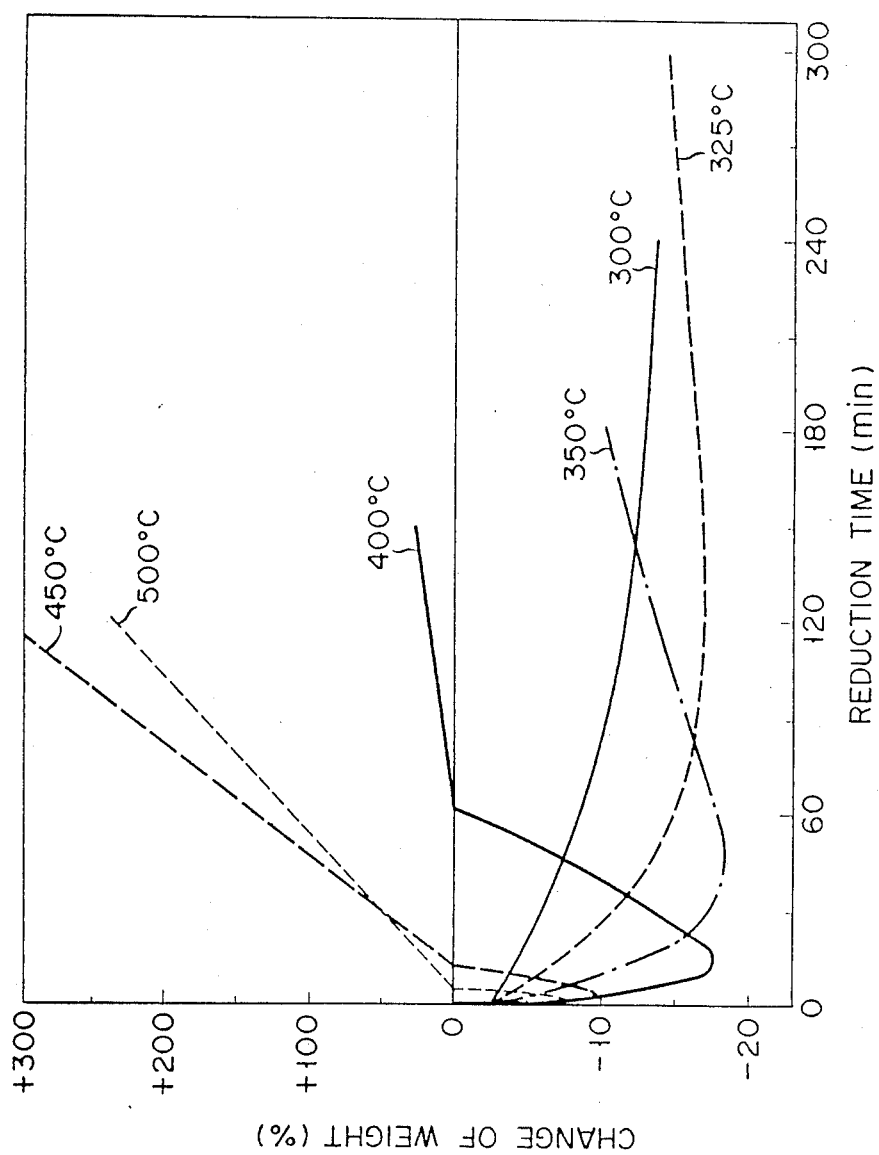
FIG. 1 is a graph showing changes in weight when $Fe_2O_3$ is reduced by CO.

When Low-Quality Iron Ore is Used as the Catalyst

Catalyst Activity Improvement of Low-Quality Iron Ore

Low-quality iron ore to be used in the method of the present invention is preferably that which contains 0.3 to 3% by weight of nickel, 10 to 50% by weight of iron and 0.5 to 10% by weight of chromium, and has a ratio of $Al_2O_3/SiO_2$ of 3 or less, and a specific surface area of 50 to 100 m²/g. An example of such low-quality iron ore is laterite ore. Low-quality iron ore having such properties is used as a catalyst for the following reasons. As catalysts, iron, nickel and chromium have a function of imparting activity to hydrogenation of aromatic compounds. As the nickel content of iron ore increases, the iron content tends to decrease. When the nickel content is 0.5 to 3% by weight, the iron content is 50 to 10% by weight. According to an experiment conducted by the present inventors, iron ore having a nickel content falling in this range can significantly impart activity to hydrogenation. As for the chromium content, when it is less than 0.5% by weight, the above-mentioned effect cannot be obtained. Similarly, when the chromium content exceeds 10% by weight, a particularly good effect cannot be obtained. However, when the chromium content falls between these limits an extremely good effect is realized. For these reasons, nickel, iron and chromium are, preferably, contained in the amounts prescribed above.

$Al_2O_3$ and $SiO_2$ have acidic catalytic activity. However, when the content ratio $Al_2O_3/SiO_2$ exceeds 3, catalytic activity decreases. In addition, alumina ($Al_2O_3$) is converted into a compound having a spinel structure with a metal, and its activity, likewise decreases. Therefore, the ratio $Al_2O_3/SiO_2$ is, preferably, 3 or less.

The specific surface area is an important factor in physically improving the catalytic activity of iron ore. When the specific surface area is less than 50 m²/g, desired ore activity cannot be obtained. However, when the specific surface area exceeds 100 m²/g, the catalytic activity is, similarly, impaired, according to an experiment conducted by the present inventors. Therefore, the specific surface area should fall preferably within a range of 50 to 100 m²/g.

However, as described above, if untreated, low-quality iron ore has a low liquefaction activity as a catalyst. This is because the iron ore contains catalyst poisons such as alkali metal salts or alkaline earth metal salts. For example, laterite ore contains 3 to 10% by weight of each of MgO, CaO, $Na_2O$, $K_2O$, and inherent moisture.

According to the present invention, in order to improve catalytic activity, low-quality iron ore is subjected to one or a combination of the following treatments.

(1) Washing with or Immersion in Water for a Long Period of Time, and Subsequent Drying This treatment removes poisons such as water soluble alkali metal salts or alkaline earth metal salts contained in iron ore, and improves the catalytic activity of the iron ore.

Table 1-1 shows an example wherein alkali metal salts contained in iron ore are removed by washing in water.

TABLE 1-1

| Treatment | Alkali Metal Salts & Alkaline Earth Metal Salts in Iron Ore (%) Type | | | |
|---|---|---|---|---|
| | MgO | CaO | $K_2O$ | $Na_2O$ |
| Before Washing with Water | 3.4 | 0.04 | 0.07 | 0.05 |
| After Washing with Water | 2.1 | 0.015 | 0.02 | 0.004 |

This treatment also serves to increase the specific surface area of the iron ore and thereby to improve the catalytic activity of iron ore. For example, a specific surface area (64.0 $m^2/g$) of iron ore can be increased to about 77 $m^2/g$ by washing with water.

The treatment is preferably performed to a degree such that after washing or immersion of the iron ore the solution has a pH of 7. This is because the pH of 7 indicates that alkali metal salts and alkaline earth metal salts have been sufficiently removed. The iron ore must be dried after the treatment.

(2) Reduction

In the reduction treatment of low-quality iron ore using carbon monoxide or hydrogen gas, ferric oxide is reduced and the specific surface area is increased so as to increase the catalystic activity of iron ore. Preferable treatment conditions are a treatment temperature of 200° to 500° C. and a treatment time of less than 120 minutes. This treatment can be performed in a gas or a solvent.

(3) Heat Treatment

In the heat treatment, low-quality iron ore is heated while air is passed through it, so as to increase the specific surface area and to improve the catalytic activity of the iron ore. (The heating temperature is preferably 200° to 500° C.)

Table 1-2 below shows an example of a specific surface area measurement of low-quality iron ore samples which were and were not heat treated.

TABLE 1-2

| Treating method | | Property Specific Area ($N^2$, BET Method) $m^2/g$ |
|---|---|---|
| Tronto | No treatment | 64.0 |
| Palawan | Washing with water | 77.2 |
| | Heat tzeatment | 83.3 |
| | $H_2$ reduction | 90.2 |
| | CO reduction | 94.5 |

The above-mentioned treatments are performed singly or in combination, and preferably as follows:

(1) Reduction (singly performed)

(2) Heat treatment (singly performed)

(3) Washing with or immersion in water for a long period of time, drying and subsequent reduction (4) Washing with or immersion in water for a long period of time, drying and subsequent heat treatment (5) Washing with or immersion in water for a long period of time and subsequent drying (6) Washing with or immersion in water for a long period of time, drying, heat treatment, and then reduction (7) Washing with or immersion in water for a long period of time, drying, reduction and then heat treatment Coal is hydrogenated using a coal liquefaction catalyst from which all poisons have been removed and/or which has an increased specific surface area. In order to obtain a prescribed catalytic effect, the low-quality iron ore can be added in the amount of 1 to 10 parts by weight based on 100 parts by weight of coal. This addition amount is smaller than that of low-quality iron ore in a conventional method using it as a catalyst without any treatment. In the present invention, hydrogenation of coal can be performed at a high conversion rate even through the use of only low-quality iron ore from which poisons have been removed and which has an increased specific surface area. However, in order to further improve the conversion rate, a promotor selected from sulfur, a sulfur compound or a mixture thereof can be added in the amount of 0.1 to 10 parts by weight based on 100 parts by weight of coal.

The coal and the catalyst are mixed with a solvent. The type and amount of solvent to be used are the same as in the conventional coal liquefaction method. For example, creosote oil is preferably added in the amount of 100 to 200 parts by weight based on 100 parts by weight of coal.

Hydrogen is added to the mixture at a high temperature and a high pressure so as to hydrogenate and liquefy the coal. The temperature and pressure for hydrogenation can be rendered more moderate than those in the coal liquefaction method using a conventional iron ore. For example, whereas when the conventional method is performed at a temperature of 450° C. and an initial hydrogen pressure of 250 $kg/cm^2$, the method of the present invention can be carried out at a temperature of 400° C. and an initial hydrogen pressure of 100 $kg/cm^2$.

When High-Quality Iron Ore is Used as the Catalyst

High-quality iron ore to be used in the method of the present invention is preferably one which consists of 50 to 70% by weight of iron, and has a ratio $Al_2O_3/SiO_2$ of 0.1 to 2.0, and a specific surface area of 1 to 30 $m^2/g$. Examples of such high-quality iron ore are iron ore having ferric oxide as a main component such as limonite or hematite. This is because, as a catalyst, the iron content serves to impart activity to hydrogenation of an aromatic compound, and iron ore containing a large amount of iron is therefore preferable as a catalyst. When the ratio $Al_2O_3/SiO_2$ is high, the iron ore exhibits an acidic catalytic activity. However, when the ratio $Al_2O_3/SiO_2$ is too high, the catalytic activity is impaired, and alumina ($Al_2O_3$) is converted into a compound having a spinel structure with a metal. For this reason, the ratio $Al_2O_3/SiO_2$ should, preferably, fall within the above-mentioned range.

The specific surface area is an important factor in physically improving the activity of iron ore as a catalyst. When the specific surface area deviates from a prescribed range, coal liquefaction activity is degraded. Thus, the specific surface area should, preferably, fall within the above-mentioned range.

According to the present invention, high-quality iron ore is not directly used as a catalyst, but is so used only after reduction with carbon monoxide. Upon reduction treatment, ferric oxide is reduced to produce FeO or metal iron.

FIG. 1 shows changes in weight over time of $Fe_2O_3$ samples reduced by carbon monoxide. Production of FeO or metal iron can be assessed from the decrease in weight of the samples. The sample weight decreases and then increases (most significantly when reduction is performed at 450° or 500° C.) since carbon produced in the reduction treatment is deposited on the sample.

The present invention will now be described by way of its Examples. The types of iron ore and treatments before using the iron ore in the respective Examples to be described below, are shown in Table 2 below.

TABLE 2

| | Type of Iron Ore | Washing with or Immersion in water | Heat Treatment | Reduction | Sulfur Addition |
|---|---|---|---|---|---|
| Example 1 | Low-quality iron ore | o | x | o (CO) | o |
| Example 2 | Low-quality iron ore | o | x | o (CO) | x |
| Example 3 | Low-quality iron ore | x | x | o (CO) | o |
| Example 4 | Low-quality iron ore | o | o | o (CO) | o |
| Example 5 | Low-quality iron ore | o | o | o (CO) | x |
| Example 6 | Low-quality iron ore | x | o | x | o |
| Example 7 | Low-quality iron ore | x | o | x | x |
| Example 8 | Low-quality iron ore | o | x | o ($H_2$) | o |
| Example 9 | Low-quality iron ore | o | x | o ($H_2$) | x |
| Example 10 | Low-quality iron ore | x | x | o ($H_2$) | o |
| Example 11 | Low-quality iron ore | o | x | x | o |
| Example 12 | Low-quality iron ore | o | x | x | x |
| Comparative Example 1 | Low-quality iron ore | x | x | x | o |
| Example 13 | High-quality iron ore | x | x | o (CO) | o |
| Example 14 | High-quality iron ore | x | x | o (CO) | x |
| Example 15 | High-quality iron ore | x | x | o (CO) | o |
| Comparative Example 2 | High-quality iron ore | x | x | x | o |

TABLE 2-continued

| Type of Iron Ore | Washing with or Immersion in water | Heat Treatment | Reduction | Sulfur Addition |
|---|---|---|---|---| o: Performed
x: Not performed

EXAMPLE 1

Coal used had 60 mesh (250 μm or less) and the properties shown in Table 3 below. A low-quality iron ore catalyst was one which was obtained by immersing low-quality iron ore, having the composition and specific surface area shown in Table 4, in distilled water for 100 hours, washing it with water, drying it under a reduced pressure, and reducing it at 350° C. for 2 hours under carbon monoxide flow. Fifty grams of the coal, 1.5 g of the low-quality iron ore and 0.3 g of sulfur were mixed with 75 g of Creosate oil, and the resultant mixture was charged into a 1l-rocking autoclave. The mixture was allowed to react at an initial hydrogen pressure of 100 kg/cm² G, and a temperature of 400° C. for a reaction time of 30 minutes. An extraction test and gas analysis of the obtained content was performed. As shown in Table 3, the test revealed that the conversion rate after tetrahydrofuran (THF) extraction was 91.8%. The conversion rate herein indicates the ratio of the total content of gas and THF soluble substance (e.g., oil, asphaltene, or preasphaltene) in the hydrogenation product (dry base; ash free base). The conversion rate used hereinafter is also the same.

TABLE 3

| | (Drumhellar) | | | | | | | |
|---|---|---|---|---|---|---|---|---|
| Total Water Content | Industrial Analysis (d.b %) | | | Element Analysis (d.a.f %) | | | | |
| (%) | Ash | VM | FC | C | H | S | H | Odiff |
| 13.4 | 9.7 | 46.8 | 43.5 | 74.1 | 4.9 | 0.4 | 1.7 | 18.9 | d.b: dry base
d.a.f: dry ash free
Ash: ash
VM: volatile material
FC: fixed carbon

TABLE 4

| | Composition (wt %) | | | | | | | | Specific Surface Area ($m^2/g$) |
|---|---|---|---|---|---|---|---|---|---|
| Type | T.Fe | $SiO_2$ | $Al_2O_3$ | MgO | CaO | $Na_2O$ $K_2O$ | NI | $Al_2O_3/SiO_2$ | |
| Toronto Palawan | 42.0 | 10.5 | 9.6 | 3.4 | 0.04 | 0.12 | 0.8 | 0.92 | 64 |

TABLE 5

| | Hydrogenation Product (%) | | | Conversion Rate |
|---|---|---|---|---|
| Type | Gas | THF Soluble Substance | Residue | (%) |
| Toronto Palawan | 8.2 | 83.6 | 8.2 | 91.8 |

EXAMPLE 2

Coal liquefaction was performed using the same coal and low-quality iron ore catalyst as in Example 1, and under the same conditions as in Example 1 except that sulfur was not added. The obtained results are shown in Table 6.

TABLE 6

| Type | Hydrogenation Product (Wt %) | | | Conversion Rate (%) |
| --- | --- | --- | --- | --- |
| | Gas | THF Soluble Substance | Residue | |
| Toronto Palawan | 8.4 | 75.4 | 14.2 | 85.8 |

EXAMPLE 3

Coal used had 60 mesh or less and the properties shown in Table 3. A low-quality iron ore catalyst was prepared from iron ore ground to 200 mesh or less (74 μm or less), and having the composition and specific surface area shown in Table 4. The catalyst was prepared by reducing this iron ore with carbon monoxide (pressure: 30 kg/cm$^2$ G; temperature: 400° C.) for 2 hours, substituting the residual gas with Ar gas, and decreasing the temperature. Fifty grams of the coal, 1.5 g of the treated iron ore and 0.3 g of sulfur were mixed with 75 g of creosote oil, and the resultant mixture was charged into a 1l-rocking autoclave. The mixture was allowed to react at an initial hydrogen pressure of 100 kg/cm$^2$ G and a temperature of 400° C. for a reaction time of 30 minutes. An extraction test and gas analysis of the obtained content was performed. The obtained results are shown in Table 7 below.

TABLE 7

| Type | Hydrogenation Product (Wt %) | | | Conversion Rate (%) |
| --- | --- | --- | --- | --- |
| | Gas | THF Soluble Substance | Residue | |
| Toronto Palawan | 8.2 | 82.6 | 9.2 | 90.8 |

EXAMPLE 4

Coal used had 60 mesh or less and properties as shown in Table 3. A low-quality iron ore catalyst was prepared from low-quality iron ore having the composition and specific surface area shown in Table 4. The catalyst was prepared by immersing the low-quality iron ore in distilled water for 100 hours, heat-treating it at 500° C. for 2 hours under air flow, and reducing it with carbon monoxide at 350° C. for 2 hours. Fifty grams of the coal, 1.5 g of the low-quality iron ore catalyst, and 0.3 g of sulfur were mixed with 75 g of creosote oil, and the resultant mixture was charged into a 1l-rocking autoclave. The mixture was allowed to react at an initial hydrogen pressure of 100 kg/cm$^2$ G and a temperature of 400° C. for a reaction time of 30 minutes. An extraction test and gas analysis of the obtained content was performed. According to the results obtained, as shown in Table 8, the conversion rate after tetrahydrofuran (THF) extraction was 92%.

TABLE 8

| Type | Hydrogenation Product (%) | | | Conversion Rate (%) |
| --- | --- | --- | --- | --- |
| | Gas | THF Soluble Substance | Residue | |
| Toronto Palawan | 8.2 | 83.8 | 8.0 | 92.0 |

EXAMPLE 5

Coal liquefaction was performed using the same coal and low-quality iron ore catalyst as in Example 4, and under the same conditions as in Example 4 except that sulfur was not added. The obtained results are shown in Table 9 below.

TABLE 9

| Type | Hydrogenation Product (Wt %) | | | Conversion Rate (%) |
| --- | --- | --- | --- | --- |
| | Gas | THF Soluble Substance | Residue | |
| Toronto Palawan | 8.0 | 77.0 | 15.0 | 85.0 |

EXAMPLE 6

Coal used had 60 mesh or less and the properties shown in Table 3. A low-quality iron ore catalyst was prepared by immersing low-quality iron ore, having the composition and specific surface area shown in Table 4, in distilled water for 100 hours, and heattreating it at 500° C. under air flow for 2 hours. Fifty grams of the coal, 1.5 g of the low-quality iron ore catalyst and 0.3 g of sulfur were well mixed with 75 g of creosote oil, and the resultant mixture was charged into a 1l-rocking autoclave. The mixture was then allowed to react at an initial hydrogen pressure of 100 kg/cm$^2$ G and a temperature of 400° C. for 30 minutes. An extraction test and gas analysis of the obtained content was performed. As shown in Table 10, the conversion rate after tetrahydrofuran (THF) extraction was 83.7%.

TABLE 10

| Type | Hydrogenation Product (%) | | | Conversion Rate (%) |
| --- | --- | --- | --- | --- |
| | Gas | THF Soluble Substance | Residue | |
| Toronto Palawan | 9.7 | 74.0 | 16.3 | 83.7 |

EXAMPLE 7

Coal liquefaction was performed using the same coal and low-quality iron ore catalyst as in Example 6, and under the same conditions in Example 6 except that sulfur was not added. The obtained results are shown in Table 11.

TABLE 11

| Type | Hydrogenation Product (Wt %) | | | Conversion Rate (%) |
| --- | --- | --- | --- | --- |
| | Gas | THF Soluble Substance | Residue | |
| Toronto Palawan | 8.2 | 59.4 | 32.4 | 67.6 |

EXAMPLE 8

Coal used had 60 mesh or less and the properties shown in Table 3. A low-quality iron ore catalyst was prepared by immersing low-quality iron ore, having the composition and specific surface area shown in Table 4, in distilled water for 100 hours, washing it with water and drying it under a reduced pressure. After this treatment, the iron ore was reduced at 350° C. for 2 hours under hydrogen flow. Fifty grams of the coal, 1.5 g of the low-quality iron ore catalyst and 0.3 g of sulfur were well mixed with 75 g of creosote oil, and the resultant mixture was charged into a 1l-rocking autoclave. The mixture was allowed to react at an initial hydrogen pressure of 100 kg/cm$^2$ G and a temperature of 400° C. for 30 minutes. An extraction test and gas analysis of the obtained content was performed. As a result, as shown in Table 12, the conversion rate after tetrahydrofuran (THF) extraction was 92.3%.

TABLE 12

| Type | Hydrogenation Product (%) | | | Conversion Rate (%) |
| --- | --- | --- | --- | --- |
| | Gas | THF Soluble Substance | Residue | |
| Toronto Palawan | 8.6 | 83.7 | 7.7 | 92.3 |

EXAMPLE 9

Coal liquefaction was performed using the same coal and low-quality iron ore catalyst as in Example 8, and under the same conditions as in Example 8 except that sulfur was not added. The obtained results are shown in Table 13.

TABLE 13

| Type | Hydrogenation Product (Wt %) | | | Conversion Rate (%) |
| --- | --- | --- | --- | --- |
| | Gas | THF Soluble Substance | Residue | |
| Toronto Palawan | 8.2 | 79.4 | 12.4 | 87.6 |

EXAMPLE 10

Coal used had 60 mesh or less and the properties shown in Table 3. A low-quality iron ore catalyst was prepared by reducing a low-quality iron ore having 200 mesh or less and the composition and specific surface area shown in Table 4 at 350° C. for 2 hours under hydrogen flow, substituting the residual gas with Ar gas and then decreasing the temperature. Fifty grams of the coal, 1.5 g of the iron ore, and 0.3 g of sulfur were well mixed with 75 g of creosote oil, and the resultant mixture was charged into a 1l-rocking autoclave. The mixture was allowed to react at an initial hydrogen pressure of 100 kg/cm$^2$ G and a temperature of 400° C. for 30 minutes. An extraction test and gas analysis of the obtained content was performed. The obtained results are shown in Table 14.

TABLE 14

| Type | Hydrogenation Product (Wt %) | | | Conversion Rate (%) |
| --- | --- | --- | --- | --- |
| | Gas | THF Soluble Substance | Residue | |
| Toronto Palawan | 8.6 | 82.7 | 8.7 | 91.3 |

EXAMPLE 11

Coal having 60 mesh or less and the properties as in Table 3 was used. A low-quality iron ore catalyst was prepared by immersing low-quality iron ore, having a mesh of 200 or less and the composition and properties shown in Table 4, in distilled water for 100 hours, washing it with water and drying it under a reduced pressure.

Fifty grams of the coal, 1.5 g of the low-quality iron ore catalyst and 0.3 g of sulfur were well mixed with 75 g of creosote oil, and the resultant mixture was charged into a 1l-rocking autoclave. After the mixture was allowed to react at an initial hydrogen pressure of 100 kg/cm$^2$ G and a temperature of 400° C. for 30 minutes, the content was subjected to an extraction test and gas analysis.

As shown in Table 15, the conversion rate after tetrahydrofuran (THF) extraction was 79.7%.

TABLE 15

| Type | Hydrogenation Product (%) | | | Conversion Rate (%) |
| --- | --- | --- | --- | --- |
| | Gas | THF Soluble Substance | Residue | |
| Toronto Palawan | 9.7 | 70.0 | 20.3 | 79.7 |

EXAMPLE 12

Coal liquefaction was performed using the same coal and low-quality iron ore catalyst as in Example 11, and under the same conditions as in Example 11 except that sulfur was not added. The obtained results are shown in Table 16.

TABLE 16

| Type | Hydrogenation Product (Wt %) | | | Conversion Rate (%) |
| --- | --- | --- | --- | --- |
| | Gas | THF Soluble Substance | Residue | |
| Toronto Palawan | 8.5 | 65.9 | 25.6 | 74.4 |

COMPARATIVE EXAMPLE 1

Coal as shown in Table 3 was used. The low-quality iron ore catalyst used was one having the composition and properties as in Table 4, and was not treated before use. Coal liquefaction was performed under the same conditions as in Example 1. The obtained results are shown in Table 17.

TABLE 17

| Type | Hydrogenation Product (Wt %) | | | Conversion Rate (%) |
| --- | --- | --- | --- | --- |
| | Gas | THF Soluble Substance | Residue | |
| Toronto Palawan | 8.2 | 67.4 | 24.4 | 75.6 |

EXAMPLE 13

The coal used had 60 mesh or less and the properties shown in Table 13. A high-quality iron ore catalyst was prepared by reducing iron ore having the composition and specific surface area shown in Table 18 with carbon monoxide (pressure: 30 kg/cm$^2$ G; temperature: 350° C.) for 2 hours, substituting the residual gas with Ag gas, and decreasing the temperature. Fifty grams of the coal, 5 g of the iron ore and 1 g of sulfur were well mixed with 75 g of creosote oil, and the resultant mixture was charged into a 1l-rocking autoclave. The mixture was allowed to react at an initial hydrogen pressure of 100 kg/cm$^2$ G and a temperature of 400° C. for 30 minutes. The obtained content was subjected to an extraction test and gas analysis. As shown in Table 19, the conversion rate after tetrahydrofuran (THF) extraction was 93.4% for iron ore A and 99.6% for iron ore B.

TABLE 18

| Iron Ore | Major Composition (wt %) | | | | Al$_2$O$_3$/ SiO$_2$ | Specific Surface Area (m$_2$/g) |
| --- | --- | --- | --- | --- | --- | --- |
| | T.Fe | SiO$_2$ | Al$_2$O$_3$ | CaO | | |
| A (Hamersley) | 59.2 | 4.38 | 2.60 | 2.60 | 0.59 | 10 |
| B | 60.0 | 0.56 | 3.01 | 3.01 | 1.18 | 13 |

TABLE 18-continued

| Iron Ore | Major Composition (wt %) | | | | $Al_2O_3/SiO_2$ | Specific Surface Area $(m_2/g)$ |
|---|---|---|---|---|---|---|
| | T.Fe | $SiO_2$ | $Al_2O_3$ | CaO | | |
| (Timblo Goa) | | | | | | |

TABLE 19

| Iron Ore | Hydrogenation Product (Wt %) | | | Conversion Rate (%) |
|---|---|---|---|---|
| | Gas | THF Soluble Substance | Residue | |
| A (Hamersley) | 8.4 | 85.0 | 6.6 | 93.4 |
| B (Timblo Goa) | 8.8 | 90.9 | 0.3 | 99.6 |

EXAMPLE 14

Coal liquefaction was performed using the same coal and high-quality iron ore as in Example 13, and under the same conditions as in Example 13 except that sulfur was not added. The obtained results are shown in Table 20.

TABLE 20

| Iron Ore | Hydrogenation Product (Wt %) | | | Conversion Rate (%) |
|---|---|---|---|---|
| | Gas | THF Soluble Substance | Residue | |
| A (Hamersley) | 8.8 | 76.5 | 14.7 | 85.3 |
| B (Timblo Goa) | 8.1 | 85.9 | 9.6 | 90.4 |

EXAMPLE 15

Coal having 60 mesh or less and the properties shown in Table 3 was used. A high-quality iron ore catalyst was prepared by mixing 5 g of an iron ore having the composition and specific surface area shown in Table 18 with 75 g of creosote oil, reducing the mixture with carbon monoxide (pressure: 30 kg/cm$^2$ G; temperature: 350° C.) for 2 hours, substituting the residual gas with Ar gas, and decreasing the temperature. After mixing 50 g of the coal, 5 g of the iron ore and 1 g of sulfur in the reduced creosote soil, the mixture was charged into a 1l-rocking autoclave. The mixture was allowed to react at an initial hydrogen pressure of 100 kg/cm$^2$ G and a temperature of 400° C. for 30 minutes. The obtained content was subjected to an extraction test and gas analysis. The obtained results are shown in Table 21.

TABLE 21

| Iron Ore | Hydrogenation Product (Wt %) | | | Conversion Rate (%) |
|---|---|---|---|---|
| | Gas | THF Soluble Substance | Residue | |
| A (Hamersley) | 8.4 | 84.0 | 7.6 | 92.4 |
| B (Timblo Goa) | 8.8 | 88.2 | 3.0 | 97.0 |

COMPARATIVE EXAMPLE 2

Coal as shown in Example 13 was used. The high-quality iron ore used was one having the composition and specific surface area as shown in Table 18 and was not treated before use. Coal liquefaction was performed using the same conditions as in Example 13. The obtained results are shown in Table 22.

TABLE 22

| Iron Ore | Hydrogenation Product (Wt %) | | | Conversion Rate (%) |
|---|---|---|---|---|
| | Gas | THF Soluble Substance | Residue | |
| A (Hamersley) | 9.2 | 62.4 | 28.4 | 71.6 |
| B (Timblo Goa) | 8.8 | 70.3 | 20.9 | 79.1 |

What is claimed is:

1. A method for preparing a coal liquefication catalyst from laterite ore which contains catalyst poisons, comprising washing the laterite ore in water for a period of time sufficient to dissolve the catalyst poisons therefrom and removing said dissolved catalyst poisons, drying and then heating the ore to increase its specific surface area.

2. The method according to claim 1, wherein the laterite ore is heated to from 200° C. to 500° C.

3. The method according to claim 1, wherein the laterite ore, after drying and heating is subjected to a reducing gas so as to improve the catalytic activity.

4. The method according to claim 3, wherein the reducing gas is at least one selected from the group consisting of carbon monoxide and hydrogen, and the reducing treatment is carried out at 200° to 500° C.

5. The method according to claim 1 wherein said catalyst poisons are selected from the group consisting of alkali metal salts and alkaline earth metal salts and mixtures thereof.

6. The method according to claim 4 wherein said catalyst poisons are selected from the group consisting of alkali metal salts and alkaline earth metal salts and mixtures thereof.

* * * * *